United States Patent
Kozdon et al.

(12)

(10) Patent No.: US 6,226,285 B1
(45) Date of Patent: May 1, 2001

(54) METHOD AND SYSTEM TO DELIVER AN AUDIOVISUAL PRESENTATION TO A WORKSTATION USING THE TELEPHONE

(75) Inventors: Peter Kozdon, Santa Clara; Eli Jacobi, Palo Alto; Naser Shikhzadegan, San Jose, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/833,988

(22) Filed: Apr. 11, 1997

(51) Int. Cl.[7] ................................................. H04L 12/28

(52) U.S. Cl. .................. 370/352; 379/101.01; 379/93.09

(58) Field of Search ...................................... 370/352–356,
370/400; 379/88.13, 88.14, 88.22, 92.03,
93.08, 93.09, 100.08, 101.01, 900; 358/400–402;
709/93.14, 93.09

(56) References Cited

U.S. PATENT DOCUMENTS

| | | | |
|---|---|---|---|
| 5,737,395 | * | 4/1998 | Irribarren ................................ 379/88 |
| 5,758,081 | * | 5/1998 | Aytac ............................... 395/200.41 |
| 5,799,063 | * | 8/1998 | Krane ...................................... 379/67 |

* cited by examiner

*Primary Examiner*—Chau Nguyen
*Assistant Examiner*—Jasper Kwoh

(57) ABSTRACT

A method and system for delivering multimedia data to a user. The multimedia data is stored on a computer network which can consist of a private network or intranet or a public network like the Internet. The multimedia data to be delivered is typically stored in a combination of hypertext markup language (HTML) and audio file formats (WAV, MPEG, AU, etc.) and typically delivered using hypertext transfer protocol (HTTP). The multimedia data contains a visual portion of data such as text and graphics and an audio portion of data such as music. The visual portion of the data is delivered to the user's computer via a computer network. The audio portion of the data is delivered to the user's telephone via a telecommunications network.

20 Claims, 5 Drawing Sheets

FIG_2

FIG_3

FIG_5

METHOD AND SYSTEM TO DELIVER AN AUDIOVISUAL PRESENTATION TO A WORKSTATION USING THE TELEPHONE

TECHNICAL FIELD

The invention relates generally to the delivery of multimedia data through a computer network, and more particularly to the delivery of visual and audio data via networks.

BACKGROUND ART

Advances in computer technology have expanded the capabilities of computers. Among other things, computers are now able to process multimedia data which integrates visual presentations of still images, animation, and video with audio presentations of sound, music, and human voices. To enable computers to process the audio portion of presentations, computers are equipped with additional hardware, software and speaker systems. The additional equipment processes the audio portion of the multimedia data and can produce a wide range of quality sound. This process typically involves transforming digital data into analog data and then into sound which is projected through speakers. As a result of this technology, sound is becoming an integral part of many computer applications. For example, many CD-ROM computer games provide elaborate animated action enhanced by sound effects.

As with computers, computer network technology has also advanced. For example, the Internet, which is an international network of computers, is a conduit for the exchange of information. There are also many private networks of computers, or intranets, that are utilized by groups such as corporations. Whether it is the Internet or a private network, computer networks are basically made up of network "servers" and "network terminals" or "personal computers." Network servers are the computers that store and help to transfer the data that is available on the network. These servers allow large amounts of data to be accessed and downloaded by any users that have access to the particular network server. Network terminals or personal computers are the computers which a user interfaces with to request and view data that is stored on network servers. These devices will be referred to simply as computers throughout this disclosure. Computers and network servers are connected by data lines such as Ethernet cable or phone cable.

Establishing a network connection depends greatly on what network is being accessed. In a corporate environment a computer may be wired into a local computer network and the connection may also provide direct access to a larger computer network such as the Internet. On the other band, a computer may access a host computer via a modem connection. Through the host connection, typically known as an Internet service provider (ISP), the computer has access to the Internet.

The computers that make up a network are able to communicate different types of data by utilizing standardized communications protocols. The world wide web (www or "web") portion of the Internet utilizes the hypertext transfer protocol (HTTP) for transferring information that has been put into hypertext markup language (HTML). HTML is a simplified derivative of SGML, or Standard Generalized Markup Language, which is a standard used to make information viewable across a variety of computer platforms and software. HTML operates through a series of codes that are placed within a text file which a web browser can interpret and translate into items such as links, lists, headings, and graphics.

The protocol, HTTP, lets web browsers communicate with special web network servers that contain collections of HTML data. HTTP is made up of four basic steps; connection, request, response, and close. In the connection phase, a web browser resident on a computer attempts to connect with a network server. Once the connection to the HTTP server is made, the browser sends a request to the server. The request specifies which protocol is being used and it tells the server what data it is looking for and how it wants the server to respond. After the request is fulfilled, the server responds by transferring the identified data to the requestor. Then, the connection between the server and the computer is closed. All of the data that is requested by the user is delivered to the user's computer together. There is no distinction between data that is intended for visual presentation or for audio presentation, it is all downloaded to the user. All of the data that is received by the computer is either received in digital format or if the data was accessed via a modem, it is converted into digital format by the modem before it is processed by the computer.

After the data is transferred to the computer, the web browser loads and displays the requested data. If the data is a graphic image the browser will launch the graphics viewer specified in its configuration settings. If the data is an audio or video file, the browser will launch a player program and present the data. Audio data is processed by the audio software and hardware in the computer and transformed into analog format and then into sound which is projected through attached speakers. Some examples of this type of multimedia data available on the Internet include video clips from movies and interactive online games.

The growing accessibly to multimedia computers and the improving ability to transfer media data over the Internet and intranets have combined to make multimedia computing more common. But, while the presentation of multimedia data downloaded from the Internet works well on multimedia computers, there are some shortcomings. Although multimedia computers are more accessible, many older computers and most laptop computers do not have sound capability. Additionally, many computers in work environments are not equipped with sound capability because the sound can disturb nearby workers or because sound capability would only rarely be utilized. Sound capability also costs extra money, which some consumers may not be willing to pay. Finally, another shortcoming is that in computers with sound capability, the sound is typically delivered from speakers into an open environment where there is limited privacy unless headphone or earphone attachments are utilized.

An example of where these problems exist is in a corporate environment. A corporation may have hundreds or thousands of employees who are located in different buildings and possibly all over the world. The corporation has a need to share information throughout the company, but in many instances computer systems are not uniform throughout the company. To communicate effectively, companies set up intranets or internal webs that operate in the same manner as the world wide web portion of the Internet. By utilizing HTTP and HTML companies communicate information between computers even though the computers themselves have different operating systems. Many corporations have intranets which successfully transfer data across the office and across the world.

As intranet technology has improved, corporations want to transfer not only text data, but also Via data throughout the corporation. Multimedia data can be used by the corporation to create multimedia presentations on a computer. The presentations can be in the form of training, sharing of technology, or financial updates. For example, an employee who wants to know about the corporate health insurance plan can access the intranet and receive a multimedia presentation at their computer which can include pictures, graphs, video, music and narration. In another example, a production engineer can add narration to a graphical presentation on how to implement the latest process improvement. The multimedia presentation can then be accessed by other engineers in other locations.

Although the multimedia presentations are helpful, as stated above there are some problems with the prior art's ability to present multimedia information. Firstly, many computers in corporations do not have sound capability. Secondly, in many corporate environments, large groups of employees work closely together. Employees may be clustered together with desks lined up side-by-side or separated only by small partitions. In these environments, the cumulative noise of multiple employees viewing multimedia presentations could be counter-productive. In fact, even one employee projecting sound from an open speaker computer system may be disturbing.

What is needed is a way of delivering sound to a computer user in a situation in which the computer does not have sound capability. Additionally, the sound needs to be delivered easily, economically, and privately, if necessary.

SUMMARY OF THE INVENTION

This invention provides a way of delivering data that is located on a computer network server to a user through both a computer network connection and a telecommunications network connection.

To begin this process, a user accesses the particular computer network where the data of interest is located. This access maybe obtained, for example, through a place of employment, a library, or a private Internet service provider.

Once the user is connected to the particular computer network, some data of interest is identified and requested by the user. For purposes of this invention, the data requested is typically multimedia data. After the user has requested the audio data to be delivered to the user's telephone, the appropriately equipped network server splits up the visual and audio portions of the data. A connection is established between the network server and the desired telephone. The visual portion of the data is delivered to the monitor of the computer in the form of text, graphics, or video. The audio portion of the data is converted from digital computer data into analog telecommunications data. The analog form of the data is delivered to the user's telephone in the form of sound. The system can deliver the visual and audio data simultaneously if needed. Examples of simultaneous delivery are a music video synchronized with a song or the narrated explanation of graphical data such as pie charts or bar graphs.

In the preferred embodiment, the method is practiced in a corporate environment. With the system to be described in place, a user is able to request that the audio or sound portion of the multimedia data be delivered to the user's telephone while the visual portion is delivered to the user's computer. To practice the invention, the user first finds the data of interest, and then requests the audio portion to be delivered to the user's telephone. The telephone will ring, and is answered by the user. The data is then delivered to the user with the visual portion being displayed on the user's computer monitor and the audio portion being played on the telephone. In this manner, a user can listen to a presentation even though the computer has no sound capability. Additionally, the delivery is accomplished without disturbing other employees in the area. In this embodiment, the user may be located in the same location as the network server or the user may be located in a remote location.

The hardware necessary for the preferred embodiment includes a computer workstation, a telephone, a specially equipped intranet web server, a telephony Internet server, and a private branch exchange (PBX) phone switching device. The computer workstation may consist of any device which can access the intranet. The telephone can be any type of phone that is tied into the corporate PBX system.

The intranet web server operates according to HTTP protocol and is equipped with various software tools. The software required on this server includes: common gateway interface (CGI) software, audio tool software, applications program interface (API) software, and media software. The software enables the splitting of the audio data from the visual data and the transferring of the audio data to the user's telephone.

The telephony Internet server (TIS) is a computer network server that contains software and hardware which enables data to be transformed from computer network compatible data to telecommunications network compatible data. Addiionally, the TIS makes the connection between the intranet server and the user's telephone. The PBX system is standard telecommunications equipment. This system acts as a mini central office of the public phone company. The PBX routes all calls that are made internally in the system and acts as a gateway to all outgoing and incoming calls traveling between the PBX and the outside telecommunications network.

Operation of the preferred embodiment is initiated only after the user has accessed the internal network or intranet and located the desired data. The user then prompts the intranet web server to deliver the visual data to the user's computer display and the audio data to the user's telephone. The intranet web server works in conjunction with the telephony Internet server and the PBX system to split the visual and audio data. The system connects to the user's telephone and transfers the audio data to the telephone and transfers the visual data to the computer. The audio and visual presentation can be synchronized as needed.

This operation in a corporate environment is also applicable to data located on the global Internet outside of the corporation's intranet. For instance, a researcher who finds multimedia data located at a university can download the information to the corporate intranet server and then proceed just as explained above.

In another embodiment, this invention may be used to enhance web browsing in a non-corporate environment, such as the home. This invention may be utilized by a computer user who accesses the Internet through an ISP. If the user does not have audio capability on their computer, delivery of audio to the telephone can be supported by the ISP. In this embodiment, the ISP would have all of the required hardware and software located at its facility. If a user accessed multimedia data somewhere on the Internet, the data could be downloaded through the ISP. The ISP's system would make the connection to the user's telephone and split and route the audio data to the user's telephone in a manner to the operation in a corporate environment. In some cases, information providers through the Internet may choose to use this technique to supply audio information to their clients.

An additional embodiment of the invention includes the capability of delivering data to a voice messaging system.

The invention would operate in basically the same way as described above. The user would identify some multimedia data to be downloaded from a computer network and request that the audio portion of the data be sent via the telephone system. The main difference would be that the audio data in the form of sounds would be delivered to a telephone answering system instead of the telephone. The user could then access the recorded sounds as desired by following the procedures of the telephone answering system.

BEST MODE FOR CARRYING OUT THE INVENTION

Figure 1:
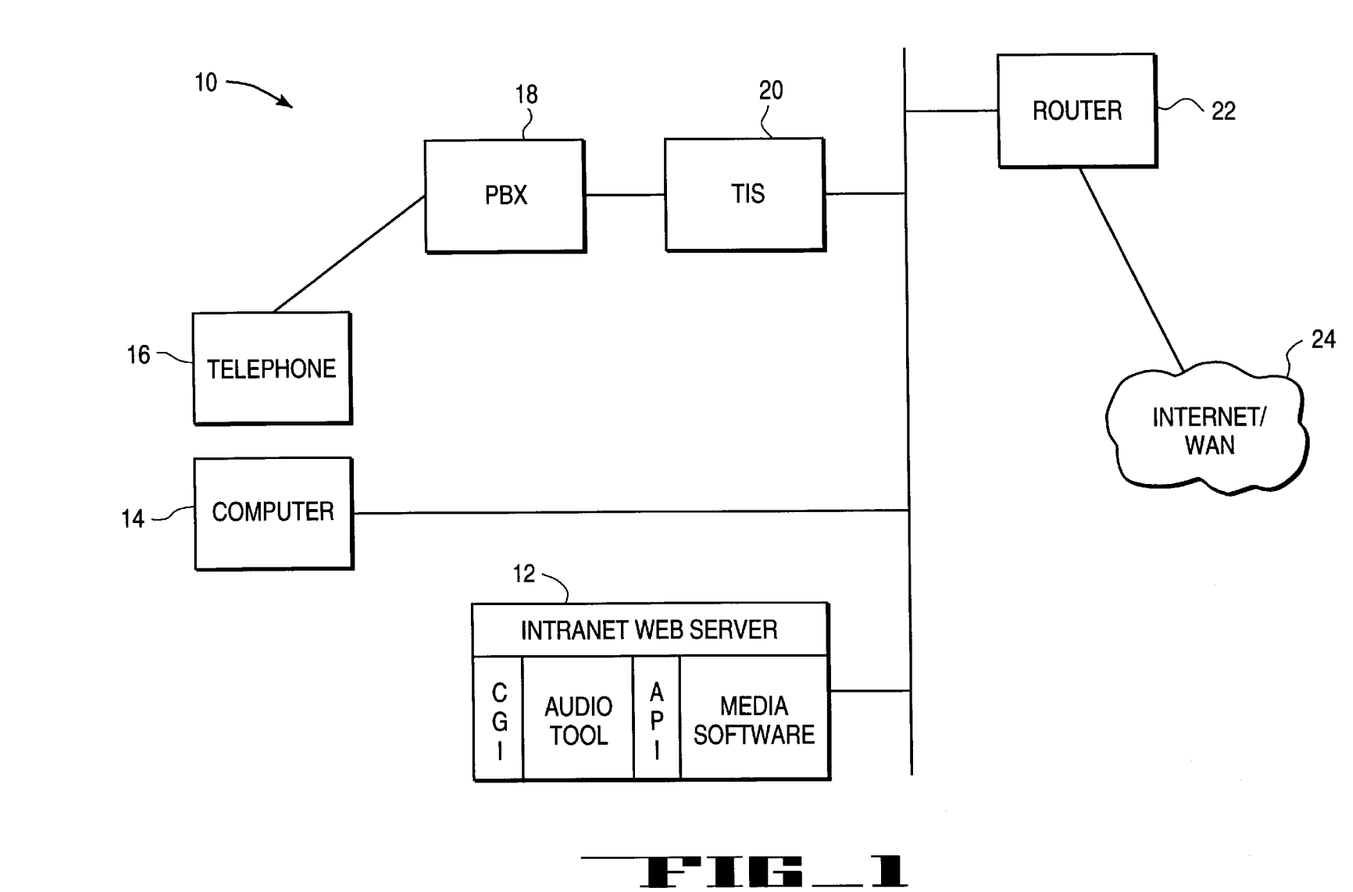
FIG. 1 is a schematic representation of a system for delivering visual data to a computer and audio data to a telephone.

The hardware necessary for carrying out the best mode of the invention is depicted in FIG. 1 and includes a computer workstation 14, a telephone 16, a specially equipped intranet web server 12, a telephony Internet server 20, and a private media branch exchange (PBX) phone switching device 18. The computer workstation 14 consists of any device which can access the intranet. This can be, for example, a traditional personal computer or a computer utilizing a specialized operating system. The telephone 16 is any type of telephone that is tied into the corporate PBX system. Although only one computer workstation and one telephone are depicted in FIG. 1, it should be understood that there can be many computers on the computer network and many phones tied into the corporate telephone system.

The internal web server 12 is a conventional web server. The internal web server 12 operates according to HTTP protocol and is equipped with various software tools. The software required on this intranet web server 12 includes: common gateway interface (CGI) software, audio tool software, applications program interface (API) software, and media software. The software enables the splitting of audio data from visual data and the transferring of audio data to a user's telephone. The intranet web server 12 stores visual and audio data. In a corporate environment, there may be only one intranet web server or there may be many intranet web servers. Each intranet web server can be equipped with the capability of delivering visual data to a computer and audio data to a telephone.

The telephony Internet server (TIS) 20 is a computer network server that contains software and hardware which enables data to be transformed from computer network compatible data to telecommunications network compatible data. Additionally, the TIS makes the connection between the intranet web server and the user's telephone.

The PBX system 18 is standard telecommunications equipment. This system functions similar to a mini central office of the public phone company. PBX systems allow corporations to accommodate thousands of phones in an internal system. The PBX system routes all calls that are internal to the system so that the calls never need to travel outside the corporation. The PBX system also acts as a gateway to all outgoing and incoming calls traveling between the PBX system and the outside telecommunications network.

As depicted in FIG. 1, the computer workstation 14, the intranet web server 12, the TIS 20, the PBX system 18, and the telephone 16 are all connected. The connections between the computer workstation 14, the intranet web server 12 and the TIS 20 are made by conventional computer networking techniques. As well, the connections between the TIS 20, the PBX system 18, and the telephone 16 are made by conventional telecommunications networking techniques.

Figure 2:
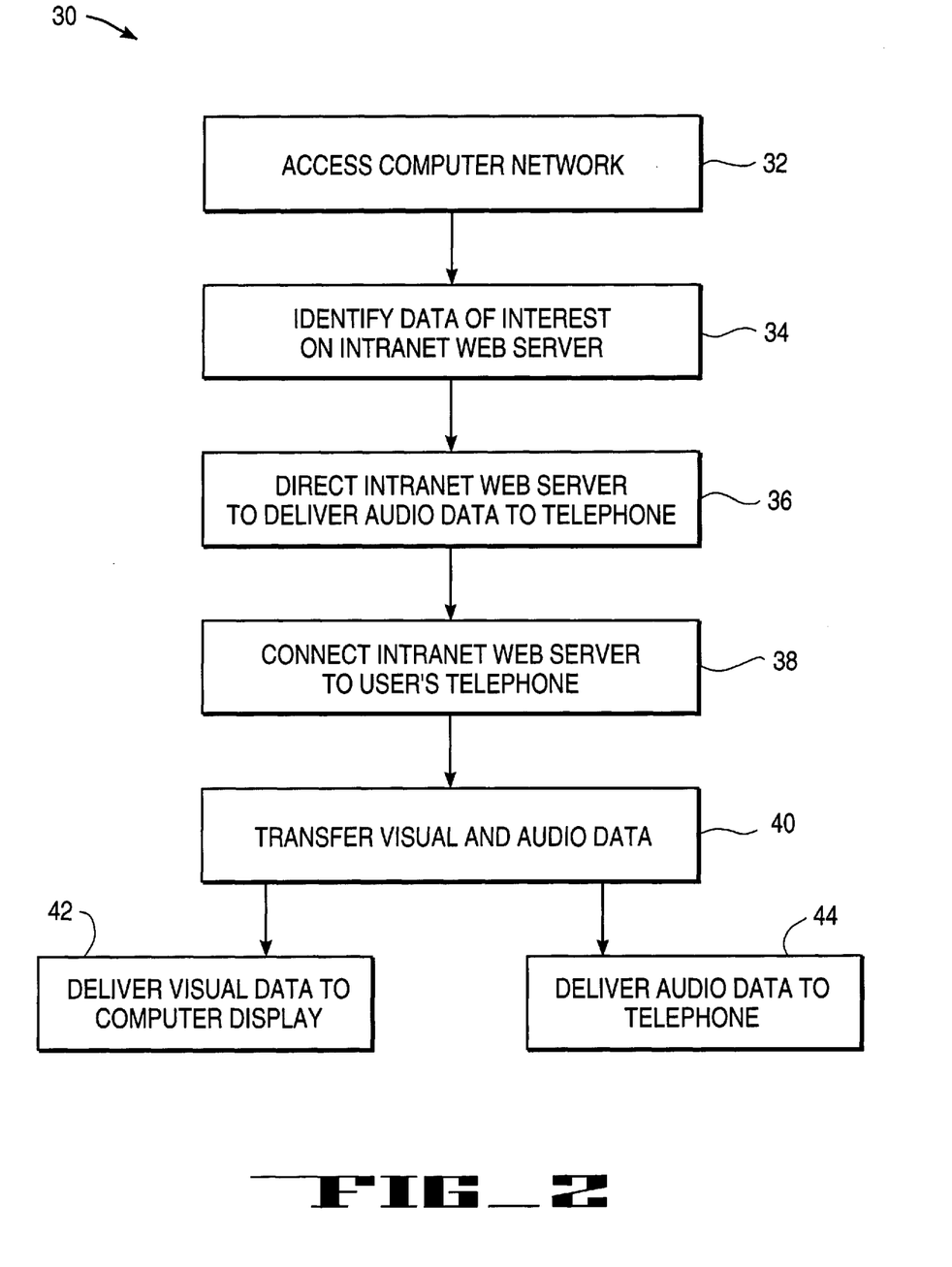
FIG. 2 is a process flow diagram for the delivery of visual and audio data from an intranet web server.

Referring to FIG. 2, the first step in carrying out the invention requires the user to access 32 a computer network. Accessing the computer network involves the user following the corporate protocol, and may require the use of a password or simply the click on an icon. Once the user is connected to the network, the user must identify 34 the data of interest on the intranet web server. Because the invention is directed at multimedia data, it is assumed that the data of interest is multimedia data which includes both visual data and audio data. The location of the data of interest is unique for every intranet web server system.

Once the data is identified, the user then directs 36 the intranet web server 12, through the CGI software, to deliver the audio data to the user's telephone. Directing the intranet web server is achieved by the user clicking on an icon or typing the appropriate command to the computer. The CGI software on the intranet web server then requests the audio tool software to set up an audio connection to the user's telephone 38. The audio tool software then uses the media software's address resolution API to find the appropriate TIS's Internet protocol (IP) address. The media software then utilizes the IP address to connect the intranet web server 12 to the TIS 20. The TIS 20 then communicates with the PBX system 18 to setup a connection to the user's telephone 16. An audio connection 38 is established between the intranet web server and the telephone when the appropriate user's telephone rings and is answered.

Next, the audio tool software starts transferring 40 encoded and compressed audio data to the media software using the media bearer transfer API. The audio data is then delivered 44 to the telephone for listening. The visual data is delivered 42 through conventional intranet means to the user's computer. The audio and visual presentations can be synchronized, if desired.

When the user prompts the computer through the CGI software that the data is no longer needed, the CGI software requests the audio tool to tear down the connection between the network server and the user's telephone.

Figure 3:
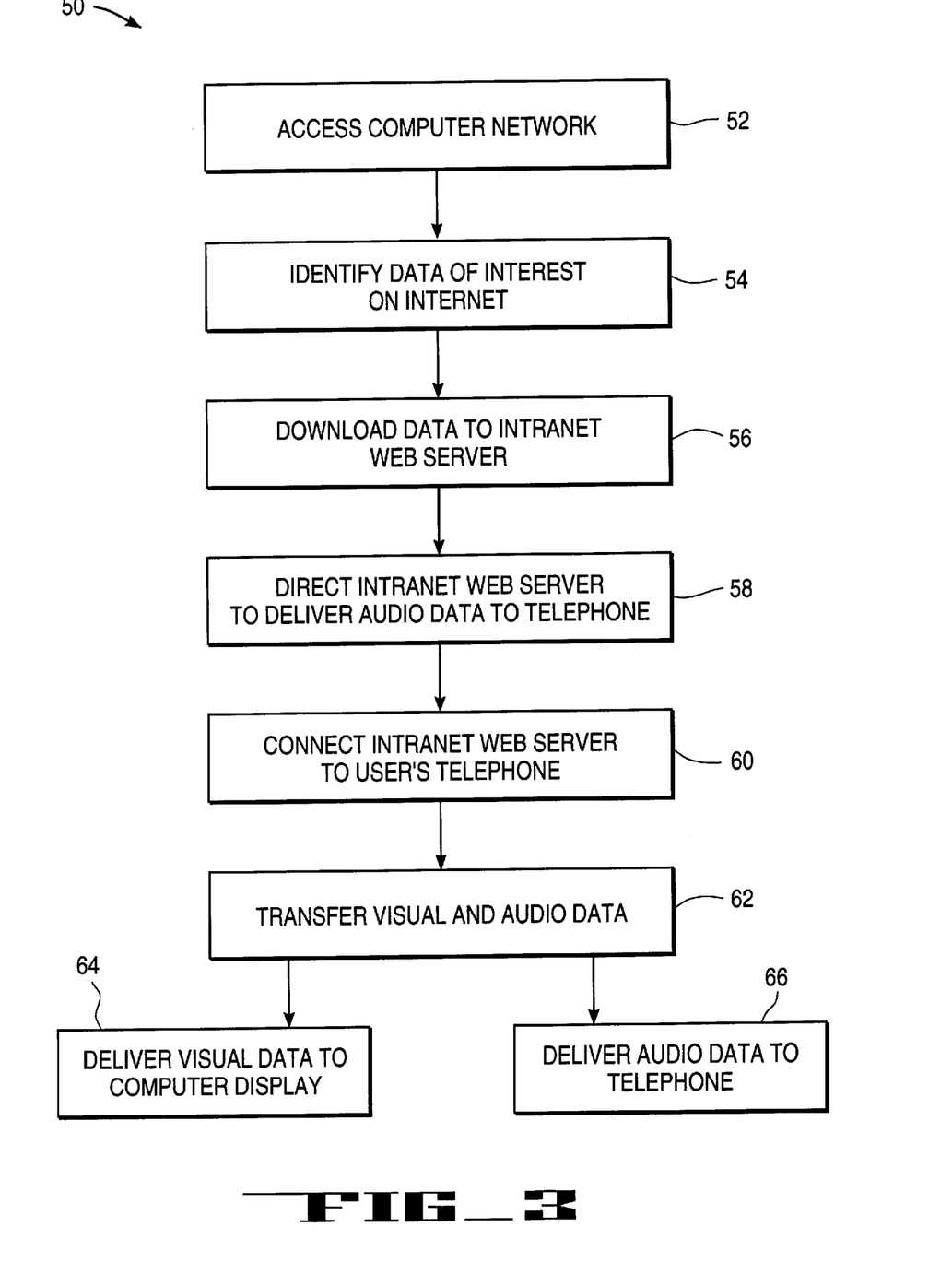
FIG. 3 is a process flow diagram for the delivery of visual and audio data from an Internet web server.

As depicted in FIG. 3, the above operation can be slightly modified to allow multimedia data to be accessed from web servers outside of the corporate environment and still have the audio data received through the telephone. In this process, the user accesses 52 a computer network. The computer network as configured in FIG. 1 allows the user access to the Internet or a wide area network (WAN) 24. This connection is enabled by a router 22 that manages data transfers to and from the Internet. The user identifies 54 data of interest on an external web server and downloads 56 the data to the corporate intranet web server. The corporate intranet web server then operates in the same manner as above. The downloaded data is handled in steps 58 through 66 in the same fashion as data that was originally located on the intranet web server.

Figure 4:
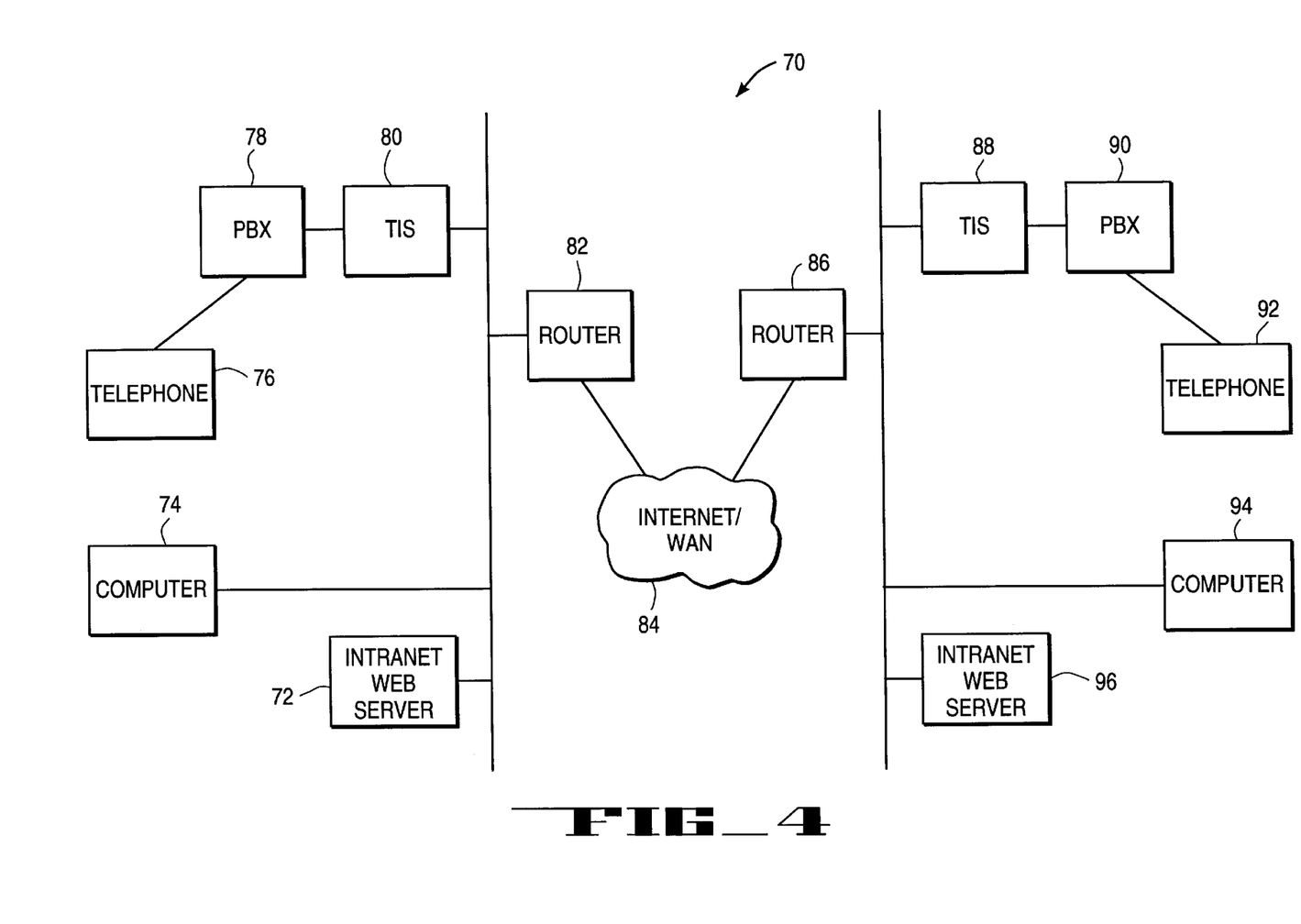
FIG. 4 is a schematic representation of a system for delivering audio and visual data between remote locations in a corporation connected by an intranet.

FIG. 4 illustrates how the system is arranged to allow multimedia presentations to be viewed within a corporation even though the data is stored at a location remote to the person who wants to use the data. In this situation, a user at a computer 74 accesses data on a remote web server 96 which could be located, for instance, in a different state or country. The user requests the web server to deliver the visual data to the computer 74 and the audio data to the user's telephone 76. The intranet web server 96 contacts, via routers 86 and 82 and the Internet 84, the TIS 80 connected to the user's telephone 76. The TIS 80 then communicates with the PBX system 78 to set up a connection to the user's telephone 76. The appropriate data is then transferred from the intranet web server 96 to the user's computer 74 and the user's telephone 76.

Figure 5:
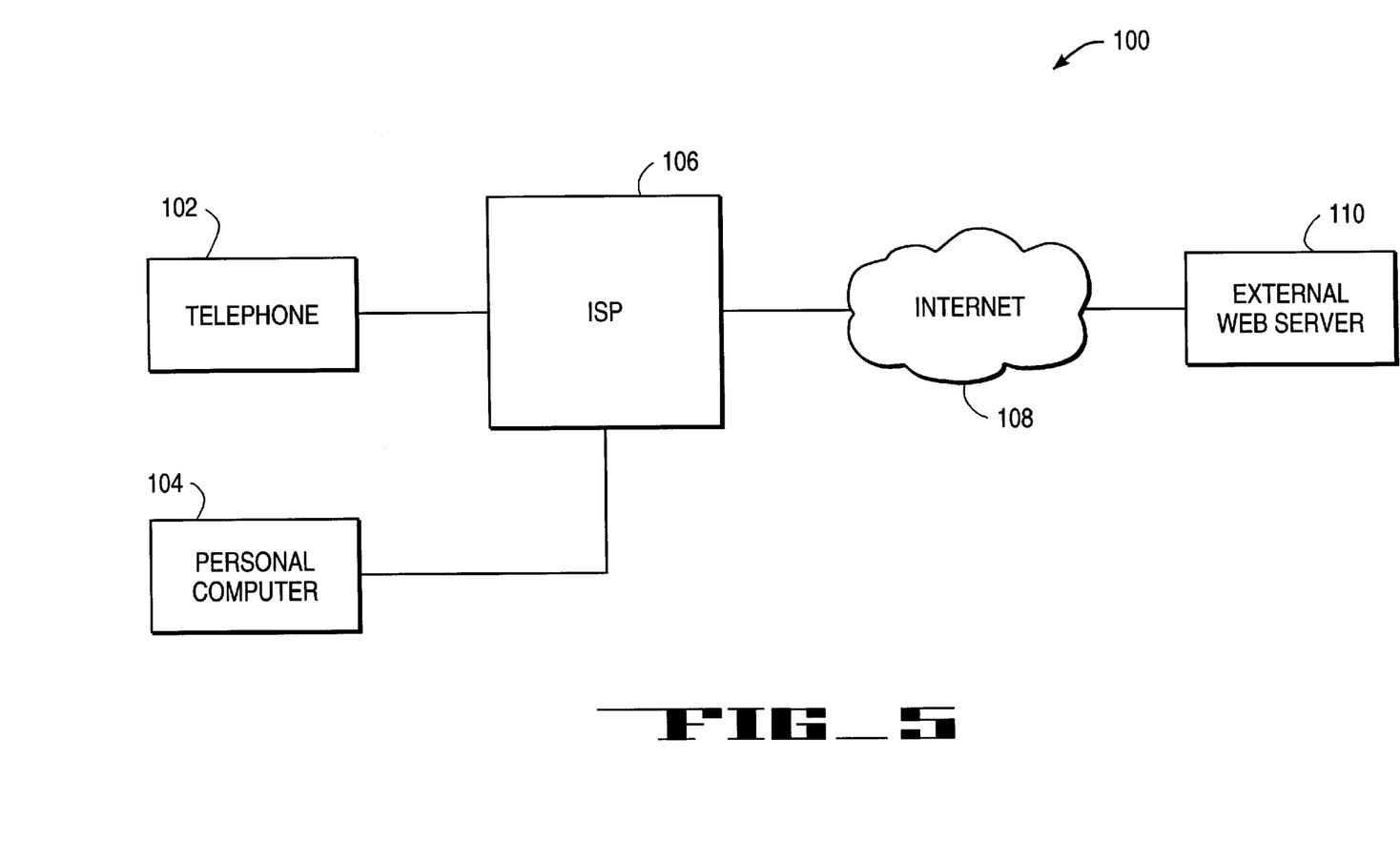
FIG. 5 is a schematic representation of a personal computer user connected to the Internet via an Internet service provider.

FIG. 5 illustrates how the system is arranged to allow multimedia data presentations to be delivered to a home environment where the user's personal computer 104 has accessed the Internet 108 via an ISP 106. Through the ISP, the user identifies multimedia data of interest on an external web server 110. The user directs the ISP 106 to deliver the visual data to the personal computer 104 and the audio data to the telephone 102, assuming the user has a sufficient number of communications lines available. The ISP is equipped with an Internet web server and a TIS as part of its system. The ISP's equipment then connects to the user's telephone via the public telecommunications system. The audio data is delivered through the connection to the user's telephone 102, and the visual data is delivered to the user's personal computer 104 through the Internet connection.

Although particular embodiments of the invention have been shown and described, it is understood that various modifications are possible within the spirit and scope of the invention. For instance, the invention could be applied to computer networks that are configured different from what has been described. As well, the invention could be applied to a computer network which utilizes a data transfer protocol other than HTTP and a data format other than HTML. Additionally, the functions performed by the intranet web server and the TIS could be combined into a single unit.

What is claimed is:

1. A method of downloading data from a computer network comprising the sequential steps of:

forming a computer network connection between a computer and a source of data of interest;

utilizing said computer to initiate a designation of said data for transfer from said source, said data having a first part that includes visual information and having a second part that includes audio information;

receiving said first part of said data at said computer in response to said designation;

visually displaying said visual information using said computer;

receiving said second part of said data via a telephone that is supported by a telecommunications network, including forming a telephone connection between said computer network and said telecommunications network having access to said telephone, said telephone connection being formed as a response to said designation; and audibly presenting said audio information using said telephony, thereby providing a video presentation and an audio presentation as a direct result of said designations utilizing said computer.

2. The method of claim 1 further comprising steps of:

downloading said first and second parts of said data from said source to a first network server;

connecting said first network server to said telephony-enabled device via said telecommunications network;

transmitting said first part of said data from said first network server to said computer; and transmitting said second part of said data from said first network server to said telephony-enabled device via said telecommunications network.

3. The method of claim 2 wherein said step of connecting said first network server to said telephony-enabled device includes connecting said first network server to a second network server; wherein said second network server assists in connecting said first network server to said telephony-enabled device and converts said second part of said data into a telecommunications network compatible signal.

4. The method of claim 1 wherein said step of forming a computer network connection includes connecting to one of an intranet or the Internet.

5. The method of claim 1 wherein said step of receiving said first part of said data includes downloading said data according to hypertext transfer protocol (HTTP).

6. The method of claim 1 wherein said step of receiving said second part of said data includes converting said second part of said data into a telecommunications network compatible signal.

7. The method of claim 1 wherein said step of receiving said second part of said data at said telephony-enabled device is in synchronization with said receiving of said first part of said data at said computer, said computer being in close proximity to said telephony-enabled device.

8. A system which transmits visual and audio data to a user comprising:

a computer connected to access a computer network;

a telephone connected to access a telephone network; said telephone being located near said computer;

a network server having memory for storing visual data files and associated audio data files; said network server being connected to said computer network such that downloading said visual data files to said computer is enabled; and means associated with said network server for bypassing said computer so as to transfer one of said audio data files to said telephone via said telephone network as a direct response to a download to said computer of a visual data file associated with said one of said audio data files.

9. The system in claim 8 wherein said computer network is connected to one of an intranet or the Internet.

10. The system in claim 8 further comprising a second network server which enables said audio data files to be transferred to said telephone via said telephone network.

11. The system in claim 10 wherein said second network server contains software and hardware which converts said audio data files from a digital data format that is compatible with audibilization by said computer to an analog data format that is compatible with audibilization by said telephone.

12. The system in claim 8 wherein said network server contains software including common gateway interface (CGI) software, audio tool software, and media software which enables the transfer of audio data between said network server and said telephone.

13. The system in claim 8 wherein said computer network and network server are configured to transfer data according to HTTP protocol.

14. A method of transmitting visual and audio data to a user comprising the sequential steps of:

accessing a computer network utilizing an access device having a display, including establishing a first connectivity path;

identifying a source of visual and audio data on said computer network for transmission to said user, including utilizing said access device to designate both said visual data and said audio data;

as an automated response to identifying said source by utilizing said access device, transmitting said visual data to said access device via said first connectivity path; and as an automated response to identifying said source by utilizing said access device, transmitting said audio data to a telephone proximate to said access device, including establishing a second connectivity path that does not include said access device and that has said telephone as a destination.

15. The method of claim 14 wherein said steps of:

identifying said source of visual and audio data includes accessing a network server on said computer network;

transmitting said visual data to said access device includes transmitting said visual data from said network server through said first connectivity path; and transmitting said audio data to said telephone includes transmitting said audio data from said network server through said second connectivity path.

16. The method of claim 14 wherein said step of transmitting said visual and audio data includes transmitting said visual and audio data to an intermediate location, wherein said intermediate location initiates transmitting said visual data to said access device, and said intermediate location automatically initiates establishing said second connectivity path and transmitting said audio data to said telephone.

17. The method of claim 14 wherein said step that includes establishing a second connectivity path having said telephone as a destination further includes connecting to a private branch exchange (PBX) system which then connects to said telephone.

18. The method of claim 14 wherein said steps of identifying and transmitting said visual and audio data includes identifying a multimedia webpage utilizing HTTP protocol.

19. The method of claim 14 wherein said step of transmitting said audio data includes converting said audio data from a computer-accessible digital format into analog format before said audio data is delivered to said telephone.

20. The method of claim 14 wherein said step of transmitting said visual data to said access device includes transmitting said audio data to said telephone in synchronization with said transmitting of said visual data to said access device.

* * * * *